May 24, 1960

D. T. AYERS, JR 2,937,620

BOOSTER MECHANISM

Filed April 3, 1957

INVENTOR
DAVID T. AYERS JR.

BY John F. Phelps

ATTORNEY

May 24, 1960 D. T. AYERS, JR 2,937,620
BOOSTER MECHANISM
Filed April 3, 1957 6 Sheets-Sheet 5

INVENTOR
DAVID T. AYERS JR
BY John F. Phillips
ATTORNEY

May 24, 1960

D. T. AYERS, JR 2,937,620

BOOSTER MECHANISM

Filed April 3, 1957

INVENTOR
DAVID T. AYERS JR

BY John F. Phillips

ATTORNEY

United States Patent Office
2,937,620
Patented May 24, 1960

2,937,620

BOOSTER MECHANISM

David T. Ayers, Jr., Birmingham, Mich., assignor to Kelsey-Hayes Company, Detroit, Mich., a corporation of Delaware Filed Apr. 3, 1957, Ser. No. 650,422

11 Claims. (Cl. 121—41)

This invention relates to a booster mechanism and is an improvement over the structure described and claimed in my copending application Serial No. 572,431, filed March 19, 1956, now Patent No. 2,817,410 granted December 24, 1957.

In the patent referred to, there is disclosed a novel type of booster brake mechanism in the form of a "package unit" which is adapted to be almost completely assembled prior to installation in the vehicle. The unit comprises a mounting bracket which carries a generally conventional master cylinder and booster motor, and a lever mechanism comprising pedal operable and power levers the former of which operates the booster motor valve mechanism and the latter of which is operated by the motor to transmit forces to the master cylinder piston. These units may be completely assembled and then installed in a vehicle forwardly of the fire wall thereof by bolting the bracket to the fire wall, whereupon it is necessary merely to connect to the lever mechanism a rod leading rearwardly through the fire wall to the brake pedal.

The apparatus in my patent identified above has been found to be particularly advantageous from several standpoints, such as manufacture and assembly, and efficiency in operation. It is desirable in such an apparatus, however, to provide the mechanism with such characteristics that an initially "soft" pedal is afforded, thus providing for the initial operation of the mechanism, including the initial energization of the booster motor, without the application of substantial force to the brake pedal.

An important object of the present invention is to provide a booster brake mechanism generally similar to the apparatus of the copending application referred to and to combine therewith novel ratio changing means associated with the lever mechanism whereby an initially "soft" pedal is provided and wherein resistance to movement of the pedal increases in later stages of brake operation to provide the desired degree of pedal reaction.

A further object is to provide such an apparatus wherein the ratio changing means is in the form of a supplemental lever arranged adjacent the pedal operable and power levers of the apparatus and which supplemental lever operates solely during initial stages of brake operation to provide the advantages referred to, and wherein the use of the supplemental lever does not enlarge the over-all size of the unit, the supplemental lever lying wholly within the longitudinal limits of the lever mechanism comprising the pedal operable and power levers.

A further object is to provide such an apparatus wherein the power lever, during initial brake operation, moves independently of and transmits no power to the master cylinder piston, and to provide an auxiliary ratio changing lever which functions during such period as the sole means for transmitting force to the master cylinder piston and at a substantially higher lever ratio than would be provided by the power lever, thus providing a "soft" initial pedal.

A further object is to provide such an apparatus wherein, at a predetermined point in the operation of the brake mechanism, pressures developed in the master cylinder act automatically to render the ratio changing lever ineffective, at which time the power lever comes into operation to deliver forces directly to the master cylinder piston to provide a higher degree of pedal reaction in later stages of brake operation.

Other objects and advantages of the invention will become apparent during the course of the following description.

In the drawings I have shown one embodiment of the invention. In this showing:

Figure 8 is an axial sectional view through the booster motor.

Figure 1:
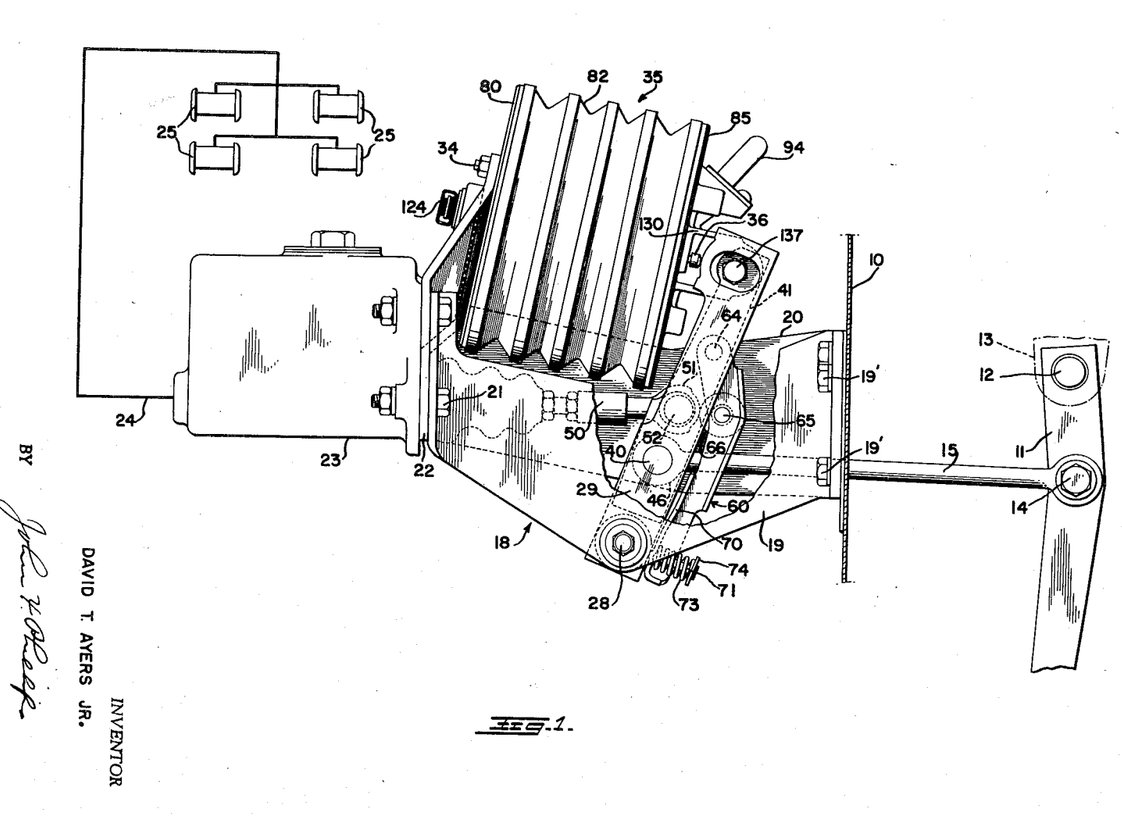
Figure 1 is a side elevation of the mechanism, the vehicle fire wall being shown in section and the wheel cylinders of the vehicle being diagrammatically illustrated, the parts being shown in their normal off brake positions.

Referring to Figure 1, the numeral 10 designates the fire wall of a motor vehicle to the right or rearwardly of which is the driver's compartment and to the left or forwardly of which is the engine compartment in which most of the present mechanism is arranged. In the driver's compartment there is shown a brake pedal lever 11 of the hanging type, pivotally supported at its upper end as at 12 by any suitable support generally indicated by the numeral 13. Below the pivot 12, the pedal lever is pivotally connected as at 14 to a forwardly extending operating rod 15 which rod, in conventional pedal operated braking systems, is connected to the piston of the master cylinder, the latter being conventionally supported by the fire wall 10.

Figures 6, 7:
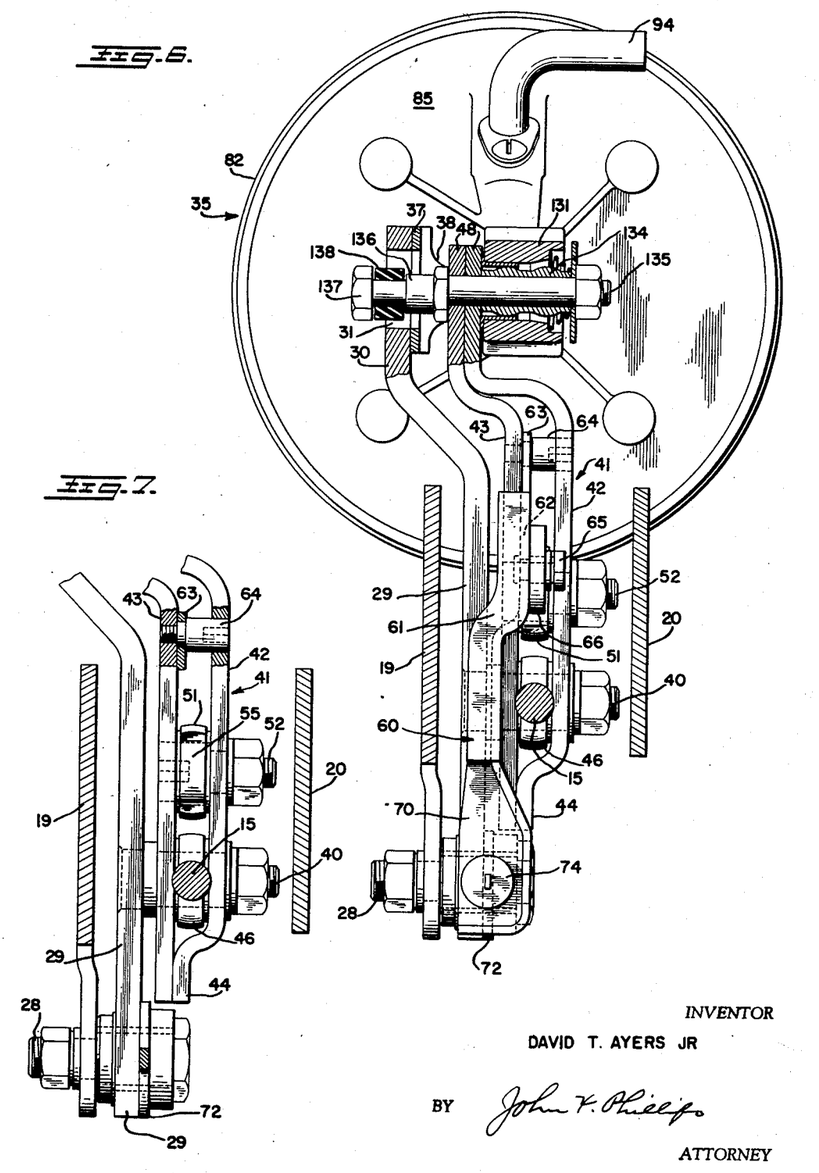
Figure 6 is an end elevation of the booster motor and associated lever mechanism, parts being shown in section.
Figure 7 is a similar view of the lower portion of the lever mechanism, most of the ratio changing lever being omitted for the purpose of illustration.
Figure 9:
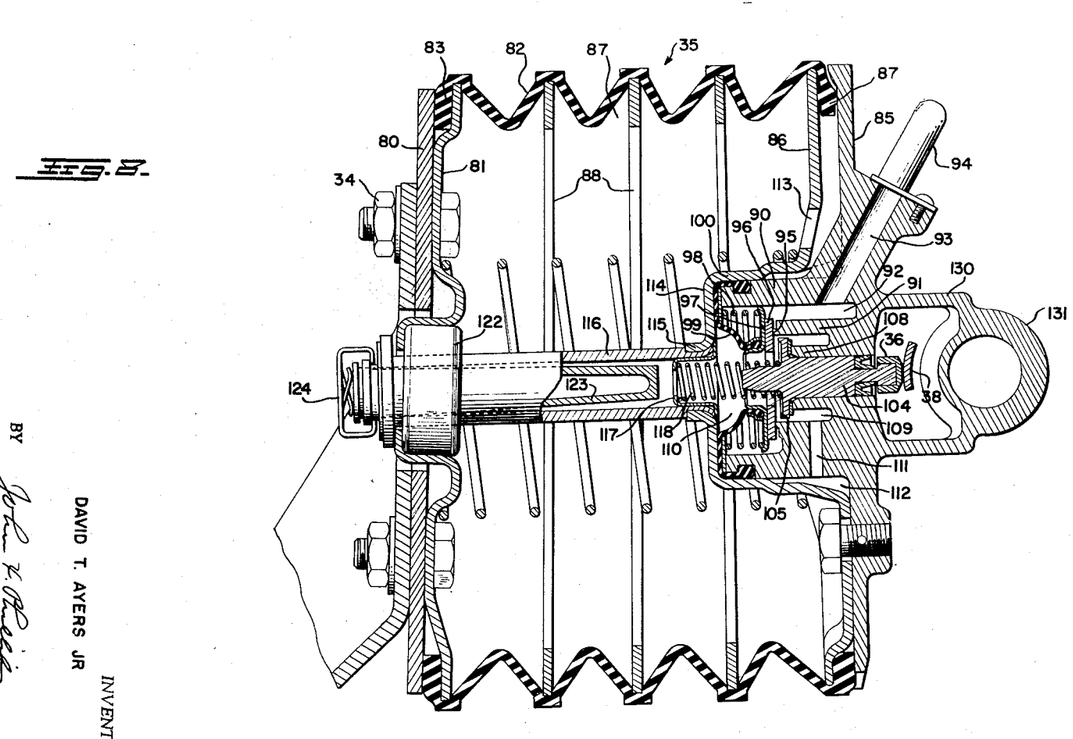

A supporting bracket structure indicated as a whole by the numeral 18 is bolted as at 19' to the fire wall 10 and is provided with spaced parallel forwardly extending walls 19 and 20 (Figures 6 and 7). At their forward ends, the side walls 19 and 20 are bolted as at 21 to a bracket 22, and the bolts 21 serve also to secure to the bracket 22 a conventional master cylinder 23 having the usual fluid displacing piston (not shown) therein. The outlet of the master cylinder is piped as at 24 to the vehicle wheel cylinders 25.

The bracket wall 19 carries a relatively heavy pivot pin 28 pivotally supporting the lower end of a motor valve operating lever 29. This lever (Figure 6) extends upwardly between and in a plane parallel to the bracket walls 19 and 20, and above such walls, the lever 29 has its upper end offset as at 30 and provided with a slot 31 for a purpose to be described.

The upper end of the bracket 22 is bolted as at 34 to a booster motor indicated as a whole by the numeral 35 and described in detail below. This motor is of the fluid pressure type and is controlled by a valve mechanism, operable in a manner which will become apparent, through an axially extending button 36. Referring to Figure 6, a metal clip 37 is secured to the upper end 30 of the valve operating lever and has a laterally projecting end 38 extending across the axis of the button 36 and engaging such button whereby movement of the valve operating lever operates the valve mechanism of the motor 35.

The valve operating lever 29 carries a laterally projecting pivot pin 40 pivotally connected to the lower end of a power lever indicated as a whole by the numeral 41 and comprising arms 42 and 43 in spaced parallel relation throughout a substantial portion of their length between the bracket walls 19 and 20. The lower end of the arm 42 is offset as at 44 into engagement with the lever arm 43, and these lever arms are welded or otherwise secured together at their lower ends. The operating rod 15 carries at its forward end a bearing eye 46 surrounding the pivot pin 40 whereby movement of the pedal lever rocks the valve operating lever 29 about its pivot 28 to energize the booster motor. The motor 35 transmits force to the upper ends 48 of the power lever arms 42 and 43, the lever ends 48 being laterally offset as shown in Figure 6 and welded or otherwise secured together.

Figure 2:
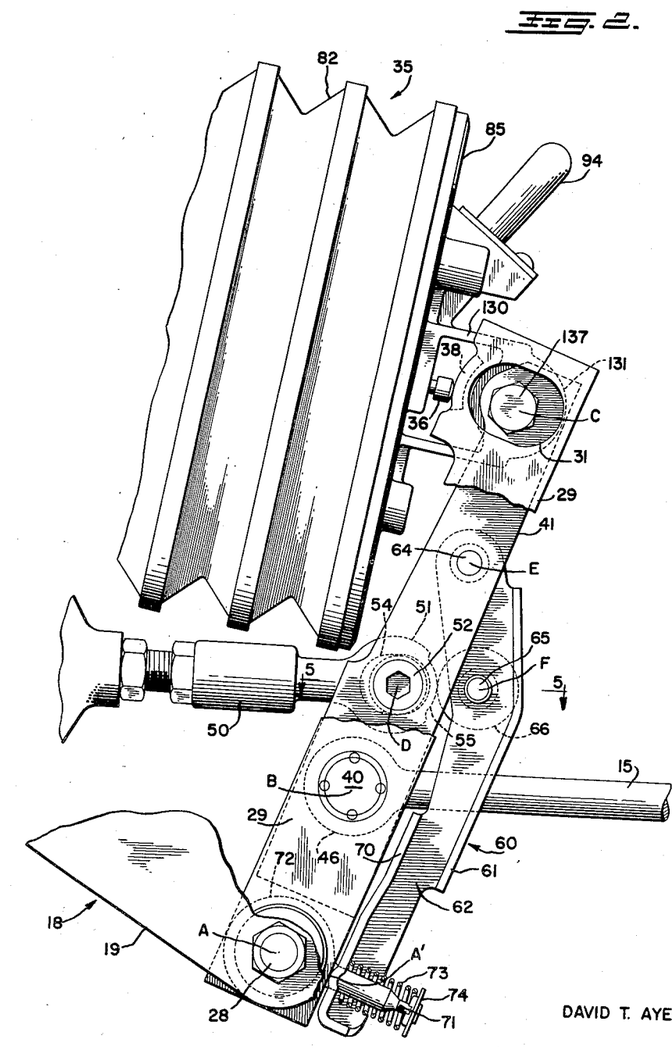
Fig. 2 is an enlarged fragmentary side elevation, parts being broken away, showing the parts in their normal off brake positions.
Figure 3:
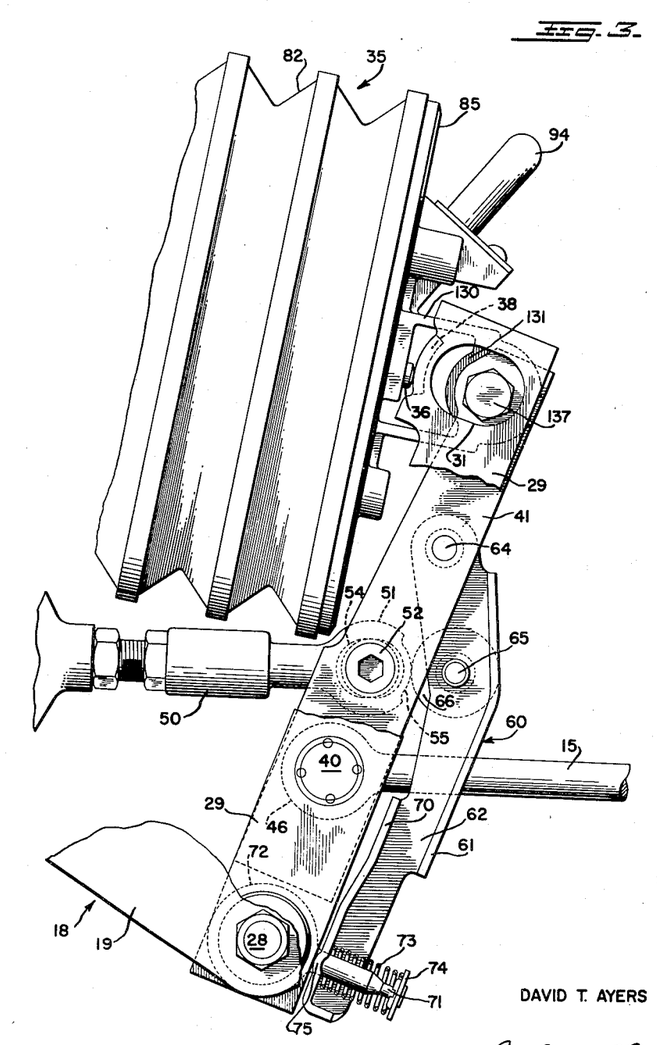
Figure 3 is a similar view showing the positions of the parts when the brake pedal has been operated to move the pedal lever to the extent necessary to operate the booster motor valve mechanism.

The piston (not shown) of the master cylinder 23 is operable by a push rod 50 having at its rear end an eye 51 surrounding a pivot pin 52 extending between and fixed to the arms 42 and 43 of the power lever. The eye 51 is provided with a slot 54 surrounding the pivot pin 52 and elongated longitudinally of the push rod 50. Accordingly, it will be apparent that the pivot pin 52 is capable of moving to a limited extent from its normal position shown in Figures 1 and 2 without transmitting any force to the push rod 50. Rearwardly thereof, the eye 51 is provided with a smooth arcuate bearing surface 55 for a purpose to be described.

The lever mechanism referred to is generally similar to the lever mechanism shown in my Patent No. 2,817,410 referred to above. The present invention combines with such lever mechanism a ratio changing device whereby relatively high lever ratios are provided in intial operation of the brake mechanism, followed by a lowering of the lever ratios during brake application. The ratio changing device thereby provides for a soft initial pedal followed by an increasing ratio of reaction against the brake pedal in later stages of brake application.

Referring to Figures 1-7, inclusive, the ratio changing device comprises a reaction lever indicated as a whole by the numeral 60 having a back wall 61 and a flange 62 projecting therefrom and extending longitudinally of the lever 60 and having its upper end offset to the right as viewed in Figure 6 whereby the upper end of the flange 62 (Figures 6 and 7) lies adjacent and preferably in contact with the lever arm 43. The upper end 63 of the reaction lever is pivotally connected to a pin 64 extending between the lever arms 42 and 43 and mounted as shown in detail in Figure 7. At a point spaced below the pivot pin 64, the flange 62 carries a pin 65 on which is rotatably mounted a roller 66 engaging the arcuate surface 55 of the eye 51.

The lower portion of the flange 62 carries a laterally extending longitudinal flange 70 through which extends a stem 71 carried by an eye 72 surrounding the pivot pin 28. A spring 73 surrounds the stem 71. This spring seats at one end against the flange 70 and at its other end against a spring seat 74 carried by the stem 71. The spring 73 serves to seat the lower end of the flange 70 against the valve operating lever 29 and the flange 70 is preferably provided with an arcuate rib 75 forming the contact point between the flange 70 and lever 29. This contact point normally engages the lever 29 in a plane passing through the axis of the pivot pin 28 and approximately perpendicular to a plane passing through the axes of the pins 52, 40 and 28.

Referring to Figure 8, it will be noted that the motor 35 preferably is of the air-suspended bellows type and comprises a forward stationary head 80 against the inner face of which is fixed a plate 81. A bellows 82 is provided at its forward end with an inturned flange 83 clamped between the members 80 and 81.

The motor further comprises a movable head having a preferably die-cast body 85 against the inner face of which is secured a plate 86, and the members 85 and 86 serve to clamp therebetween an inturned flange 87 formed at the rear end of the bellows 82. The two motor heads and the bellows 83 form therewithin a variable pressure chamber 87 normally connected to the atmosphere and connected by a valve mechanism, to be described, to a source of vacuum. Radial collapsing of the bellows is prevented by subtending rings 88.

The cast head 85 is provided with an integral hub portion 90 extending into the motor and provided with a radially inner annular wall 91 forming with the hub 90 an annular chamber 92 communicating through a passage 93 with a nipple 94 adapted to be connected to a suitable source of vacuum. The forward or inner end of the wall 91 forms a valve seat 95 normally engaged by a circular resilient valve 96 carried by a plate 97 urged to a valve seating position by a spring 98. The plate 97 is sealed relative to the hub 90 by a diaphragm 99 the outer periphery of which is clamped between the hub 91 and an axial extension 100 formed integral with the plate 86.

The valve operating button 36 previously described is carried by the rear end of a stem 104 the forward portion of which carries an annular seat 105 engageable with, but normally disengaged from the valve 96. The valve seat 105 is limited in its rear movement by a shoulder formed at the rear end of a bearing 108 integral with the hub 90 and in which the stem 104 is slidable. Outwardly of the bearing 108 is formed an air chamber 109 normally communicating around the valve seat 105 and through the central opening in the valve 96 with an air chamber 110 formed within the diaphragm 99. The chamber 109 communicates through passage 111 with a space 112 between the head members 85 and 86 and such space communicates with the motor chamber 87 through a port 113.

The axial extension 100 of the plate 86 extends radially inwardly as at 114 over the adjacent portion of the diaphragm 99 and terminates in a forwardly extending short tubular section 115 rigidly connected to the adjacent end of an air tube 116. The interior of this tube is in fixed communication with the air chamber 110. A spring seat 117, having an axial opening, is arranged in the right-hand end of the tubular member 116. A spring 118 is arranged between this spring seat and the stem 104 to bias the latter to the normal position shown in Figure 8.

The tubular member 116 slides through suitable bearing and sealing means 122 carried by the wall 81 and so formed as to seal the motor chamber 87 from the atmosphere while permitting limited rocking movement of the axis of the tubular member 116. A frusto-conical air cleaner 123 of any suitable material is mounted within the tubular member 116 and is held in position in the tubular member 116 by a clip 124. The specific material and structure of the air cleaner 123 and the means for supporting it in position form no part of the present invention. The specific valve mechanism shown in Figure 8 is disclosed and claimed in my copending application Serial No. 618,737, filed October 29, 1956, now Patent No. 2,862,477, granted December 2, 1958.

The body of the head 85 is provided with a preferably integral rearwardly extending yoke 130 terminating in an eye 131. It is between this eye and the button 36 that the laterally projecting valve operating finger 38 is arranged. Referring to Figure 6, a sleeve 134 projects through the eye 131 and supports a pivot pin 135 in the form of a bolt passing through the lever ends 48. The pivot pin 135 carries an axially projecting portion 136 reduced adjacent its head 137 and surrounded by a preferably resilient bushing 138 arranged in the slot 31. The bushing 138 is normally spaced from both ends of the slot 31 to provide for valve operating movement of the upper end of the lever 29 without interference with the bolt 135.

*Operation*

When the brake is to be operated, the pedal 11 is depressed to transmit movement through the operating rod 15 to the pivot pin 40 to move the valve operating lever 29. The upper end of this lever moves from the normal position shown in Figure 2 to the position shown in Figure 3, the finger 38 depressing the push button 36. The pivot pin 135 and the upper end of the power lever 41 remain stationary due to the play provided by the slot 31.

Referring to Figure 8, it will be noted that the vacuum valve seat 95 is normally closed while the air valve seat 105 is open. Accordingly, the motor chamber 87 is connected to the atmosphere through port 113, space 112, chamber 109, chamber 110 and tubular member 116. When the finger 38 (Figure 8) moves the valve stem 104 to the left, the valve seat 105 engages the valve 96, thus disconnecting the chamber 109 from the atmosphere. Slight further movement of the valve seat 105 to the left of such lap position moves the valve 96 from the seat 95, thus connecting the vacuum chamber 92 with the chamber 109. This chamber being in communication with the interior of the motor as stated above, air will be exhausted from the motor chamber 87 and atmospheric pressure, acting against the outer face of the head 85, will move the yoke 130 and eye 131 to the left, thus transmitting movement through sleeve 134 (Figure 6) to the pivot pin 135 and thus to the upper ends 48 of the elements of the power lever 41.

Upon initial energization of the motor in the manner described, force will be transmitted to the upper end of the power lever 41 to swing it about its pivot 40. Initial movement of the power lever in this manner takes place independently of the master cylinder piston push rod 50, the movement taking place within the limits of the slot 54. However, movement of the power lever will move the pivot pin 64 to the left, thus causing the ratio changing lever 60 to rock on its pivot point 75 and transmit movement from the roller 66 to the arcuate surface 55 of the eye 51. Thus initial movement will be imparted to the push rod 50 by the roller 66 during initial operation of the brake pedal, and this will become more apparent below as the various lever ratios are described with respect to the different pivot axes involved.

Continued depression of the brake pedal will continue the exhaustion of air from the motor chamber 87 to further move the power lever 41 as the pedal lever swings the valve operating lever 29 about its pivot 28, and the sleeve 138 (Figure 6) will remain spaced from the ends of the slot 31. Initial movement of the brake lever to energize the motor moves the lever mechanism and associated parts from the position shown in Figure 2 to the position shown in Figure 3, and the resilient sleeve 138 (Figure 6) obviously will have moved relatively closer to the right-hand limit of the slot 31. Substantially this arrangement of parts will remain until the motor 35 is energized to its maximum extent, as further described below.

The parts continue to move in the manner stated with the contact point 75 of the ratio changing lever 60 remaining in contact with the valve operating lever 29. As brake pedal and motor operation continue, it will be apparent that pressure will be progressively built up in the master cylinder with the piston thereof actuated solely by force transmitted by the roller 66. Up to a given point in the generation of pressure in the master cylinder, for example 50 p.s.i., the spring 73 will be strong enough to maintain the contact point 75 in engagement with the valve operating lever 29.

Figures 4, 5:
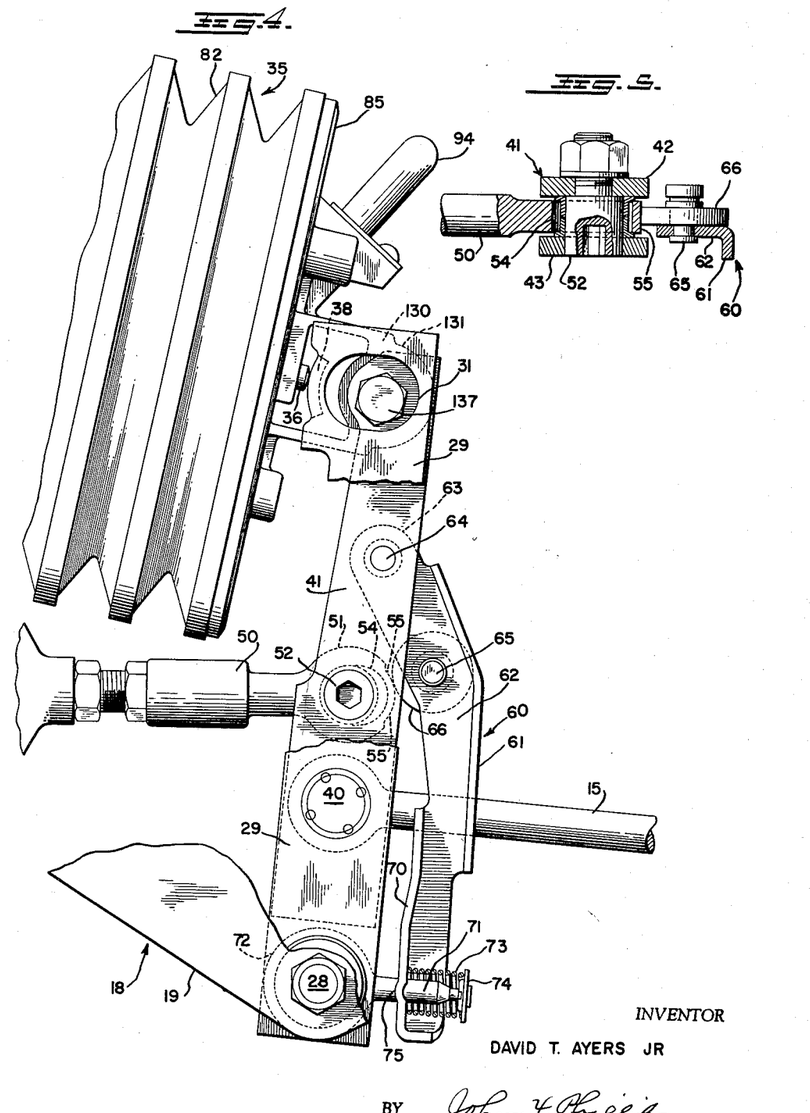
Figure 4 is a similar view showing the positions of the parts after the ratio changing lever has been rendered ineffective for transmitting power to the master cylinder piston.
Figure 5 is a fragmentary sectional view on line 5—5 of Figure 2.

When pressure in the master cylinder increases above the predetermined point referred to, the reaction transmitted from the rod 50 through the eye 51 to the roller 66 will become sufficient to overcome the loading of the spring 73. At the same time, the power lever will continue to swing to the left about its pivot 40 from the position shown in Figure 3 to the position shown in Figure 4. Very shortly a point will be reached at which the pivot pin 52 moves to the lefthand limit of the slot 54 as shown in Figure 4, and the increased reaction against the master cylinder piston will swing the lower end of the lever 60 to disengage the contact point 75 (Figure 4) from the valve operating lever 29. The limit of swinging movement of the lower end of the lever 60 will be as shown in Figure 4, there being no further motion transmitted from the eye 51 to the roller 66 after the left-hand end of slot 54 engages the pivot pin 52. The power lever 41 then will directly transmit force to the rod 50 and such transmission of force will continue throughout the remainder of the brake operation.

The use of the ratio changing lever provides a higher leverage ratio between the rods 15 and 50 during initial brake actuation, and this ratio will diminish when the parts reach the positions shown in Figure 4, as further referred to below. The motor delivers power to the upper end of the power lever 41 and the pedal operated rod 15 delivers power through pivot pin 40 to the power lever, the motor 35 and pedal lever 11 thus combining their forces to operate the push rod 50. As the point of "power run-out" approaches, that is, the point at which a maximum exhaustion of air from the motor chamber 87 occurs, the operation of the motor will slow down and when the point of power run-out is reached, the valve operating lever 29 tends to overrun the position of the power lever 41. When this occurs, the right-hand end of the slot 31 will move into engagement with the resilient sleeve 138 (Figure 6) and throughout the remainder of the brake application, the levers 29 and 41 will move as a unit. The maximum brake application will be determined by the maximum force which the operator can exert against the pedal 11.

When the brakes are to be released, the brake pedal will be released, thus relieving pressure between the finger 38 (Figure 8) and the button 36. The valve return springs will then restore the normal position of the parts as shown in Figure 8 and air will be admitted into the motor chamber 87. The motor return spring, which is conventional, will then return the movable motor head 85 to its normal position shown in Figures 1 and 2. Pressure having been released from the rod 50, such rod will be returned to its normal position by the usual return spring (not shown) in the master cylinder, and the relieving of the pressure from the roller 66 will permit the spring 73 to return the lower end of the ratio changing lever 60 to its normal position shown in Figures 1 and 2.

For the purpose of clarifying the description of the various lever lengths involved in the transmission of motion between the rods 15 and 50 and the movable head of the motor, the axes of the various pivot points have been designated by letters as follows:

Pivot pin 28—axis A
Pivot point 75—axis A′
Pivot pin 40—axis B
Pivot pin 137—axis C
Pivot pin 52—axis D
Pivot pin 64—axis E
Pivot pin 65—axis F When the motor is initially energized as stated above, movement will be imparted to axis C and thus to the upper end of the power lever 41. The power lever initially moves independently of the push rod 50 by virtue of the slot 54. If such a slot were not employed and the pivot pin 52 were directly connected to the rod 50, the lever ratio involved would be BC:CD. With the present construction, however, motion is not transmitted under such conditions and movement is imparted to the axis E by the power lever 41 with the lower end of the ratio changing lever 60 remaining engaged with the lever 29 at the pivot pin A'. The roller 66 will impart movement to the push rod 50 as stated. This provides a ratio of operation of the eye 51 which will be the combination of two ratios, namely BC:EC and A'E:A'F. With the approximate lever lengths illustrated, a direct actuation of the eye 51 by the power lever 41 would be 3:2, whereas the combination ratio referred to would be about 3:1. The latter lever ratio occurs during initial brake operation and provides an initial "soft" pedal.

When the pressure in the master cylinder builds up to the predetermined point referred to, the lower end of the lever 60 will be swung out of operation to the position shown in Figure 4, whereupon the lever ratio will be BC:CD, or approximately 3:2. This obviously provides an increased ratio of reaction against the brake pedal, as is desired.

In my Patent No. 2,817,410, referred to above, a lever ratio of 1:1 was provided due to the fact that the pivotal connections of the pedal push rod and master cylinder push rod lie in a common horizontal plane. This condition affects the size of the master cylinder when a depending brake pedal of limited travel is employed, it being necessary to employ a master cylinder larger than conventional size. Moreover, with such prior construction, the arrangement of the pedal rod and master cylinder push rod pivots in a common plane necessitated the axial offsetting of these pivotal connections, thus appreciably unbalancing the points of application of the forces. The present construction is advantageous over the structure of my copending application just referred to in that the pivot pins 40 and 52 are arranged one above the other, thus more efficiently balancing the transmission of forces. Moreover, the arrangement is such that the ratio of travel of the rod 15 to travel of the rod 50 is 2:3, and this multiplication of movement of the rod 50 permits the present apparatus to be used with a standard master cylinder.

In addition to these advantages so far as efficiency is concerned, it is particularly noted that the present construction affords the additional highly important advantage of providing a "soft" initial brake pedal with a higher ratio of reaction against the brake pedal in later stages of brake operation after the left-hand end of the slot 54 engages the pivot pin 52.

The slots 31 and 54 are so designed that in the invent of a failure of power in the motor the play in the two slots will be taken up simultaneously. Under such conditions, therefore, operation of the brake pedal will take up the play in the two slots referred to, and the application of foot pressure on the pedal will cause the levers 29 and 41 to turn as a unit for the application of pedal pressures to the master cylinder piston.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster mechanism comprising a push rod, a fluid pressure motor having a pressure responsive element and a valve mechanism connected between said motor and sources of different pressures and normally balancing motor pressures, said valve mechanism having a valve operating element projecting therefrom, a valve operating lever pivoted at one end to turn on a fixed pivot axis and having its other end engaging said valve operating element, a power lever pivotally connected at spaced points to said valve operating lever and to said pressure responsive element, a lost motion connection between said power lever and said push rod whereby said power lever is movable from a normal off position without transmitting force to said push rod, means connected between said power lever and said push rod for increasing the leverage ratio between said power lever and said push rod, and resilient means biasing said first-named means into engagement with said push rod with a predetermined force whereby, when forces reacting against said push rod increase to a predetermined extent, said resilient means will yield and said lost motion connection will be taken up to directly deliver power from said power lever to said push rod.

2. A booster mechanism comprising a push rod, a fluid pressure motor having a pressure responsive element and a valve mechanism connected between said motor and sources of different pressures and normally balancing motor pressures, said valve mechanism having a valve operating element projecting therefrom, a valve operating lever pivoted at one end to turn on a fixed pivot axis and having its other end engaging said valve operating element, a power lever pivotally connected at spaced points to said valve operating lever and to said pressure responsive element, a lost motion connection between said power lever and said push rod whereby said power lever is movable from a normal off position without transmitting force to said push rod, a ratio changing lever pivotally connected to said power lever and having a portion engaging said push rod, and spring means biasing said portion of said ratio changing lever into engagement with said push rod with a predetermined maximum resilient force whereby, when reaction forces acting against said push rod increase to a predetermined extent, said spring means will yield and said lost motion connection will be taken up for the direct transmission of power from said power lever to said push rod.

3. A mechanism according to claim 2 wherein said lost motion connection lies between said fixed pivot axis and the connection of said power lever with said pressure responsive element, said ratio changing lever being pivoted at one to said power lever between said lost motion connection and the point of connection of said power lever with said pressure responsive element, the other end of said ratio changing lever engaging said valve operating lever, said spring means being connected to said other end of said ratio changing lever and biasing it into engagement with said valve operating lever.

4. A booster mechanism comprising a push rod, a fluid pressure motor having a pressure responsive element and a valve mechanism connected between said motor and sources of different pressures and normally balancing motor pressures, said valve mechanism having a valve operating element projecting therefrom, said valve operating element being spaced laterally to one side of said push rod, a fixed pivot pin spaced laterally to the opposite side of said push rod, a valve operating lever pivoted at one end on said fixed pivot pin and having its other end engaging said valve operating element, a power lever pivotally connected to said valve operating lever between said fixed pivot pin and said push rod, one end of said power lever being connected to said pressure responsive element adjacent the point of engagement of said valve operating lever with said valve operating element, a lost motion connection between said power lever and said push rod, pedal operable means for moving said valve operating lever, leverage ratio multiplying means connected to said power lever and having a portion engaging said push rod, and spring means urging said portion of said ratio multiplying means into engagement with said push rod, said spring means having a predetermined loading whereby it yields when reaction forces against said push rod increase to a predetermined point whereupon said lost motion connection is taken up and power is directly transmitted from said power lever to said push rod.

5. A mechanism according to claim 4 provided with a lost motion connection between said power lever and said valve operating lever adjacent the point of engagement of the latter with said valve operating element, said lost motion connections being so constructed as to be simultaneously taken up upon a failure of power in said motor for the simultaneous pedal operation of said power lever and said valve operating lever.

6. A booster mechanism comprising a push rod, a fluid pressure motor having a pressure responsive element and a valve mechanism connected between said motor and sources of different pressures and normally balancing motor pressures, said valve mechanism having a valve operating element projecting therefrom, said valve operating element being spaced laterally to one side of said push rod, a fixed pivot pin spaced laterally to the opposite side of said push rod, a valve operating lever pivoted at one end on said fixed pivot pin and having its other end engaging said valve operating element, a power lever pivotally connected to said valve operating lever between said fixed pivot pin and said push rod, one end of said power lever being connected to said pressure responsive element adjacent the point of engagement of said valve operating lever with said valve operating element, a lost motion connection between said power lever and said push rod, pedal operable means for moving said valve operating lever, a ratio changing lever pivotally connected at one end to said power lever between said push rod and the point of connection of said power lever to said pressure responsive element, said ratio changing lever between its ends having a portion engaging said push rod, and spring means engaging said ratio changing lever to maintain said portion thereof in engagement with said push rod until reaction forces against said push rod increase to a predetermined point whereupon said spring means will yield and said lost motion connection will be taken up for the direct transmission of power from said power lever to said push rod.

7. A mechanism according to claim 6 wherein the other end of said ratio changing lever engages said valve operating lever, said spring means engaging said ratio changing lever adjacent the point of engagement of the latter with said valve operating lever.

8. A mechanism according to claim 6 provided with a pivot pin pivotally connecting said power lever and said valve operating lever, said pedal operable means being connected to transmit force to such pivot pin.

9. A mechanism according to claim 6 provided with a pivot pin lying between said fixed pivot pin and said push rod and pivotally connecting said power lever to said valve operating lever, said pedal operable means comprising a pedal operable rod connected to said last-named pivot pin, said push rod and said pedal operable rod having axes in spaced parallel relation and lying in a common plane perpendicular to the axes of said pivot pins.

10. A booster mechanism comprising a push rod, a fluid pressure motor having a pressure responsive element and a valve mechanism connected between said motor and sources of different pressures and normally balancing motor pressures, said valve mechanism having a valve operating element projecting therefrom, a valve operating lever pivoted at one end to turn on a fixed pivot axis and having its other end engaging said valve operating element, an operating rod connected to said valve operating lever, a power lever pivoted at spaced points to said valve operating lever and to said pressure responsive element, a lost motion connection between said power lever and said push rod whereby said power lever is movable from a normal off position without transmitting force to said push rod, means connected between said valve operating lever and said push rod to effect movement thereof within the limits of said lost motion connection upon operation of said operating rod at a predetermined ratio of movement of said operating rod relative to said push rod, and means for rendering said last-named means inoperative when forces reacting against said push rod increase to a predetermined extent for changing the ratio of movement of said operating rod relative to said push rod.

11. A mechanism according to claim 10 wherein said first-named means comprises a third lever pivoted to said valve operating lever and having a portion normally engaging said pushrod, said means for rendering said first-named means inoperative comprising a spring normally holding said third lever in a normal position relative to said valve operating lever and which spring is adapted to be overcome by said push rod when said forces reacting against said push rod increase to said predetermined extent.

References Cited in the file of this patent
UNITED STATES PATENTS

| | | |
|---|---|---|
| 2,690,740 | Hupp | Oct. 5, 1954 |
| 2,706,020 | Freers et al. | Apr. 12, 1955 |
| 2,799,252 | Ingres | July 16, 1957 |
| 2,855,901 | Price | Oct. 14, 1958 |